Feb. 18, 1941. T. R. CONNOR 2,232,439
MEANS FOR STORING GRAIN
Filed Sept. 27, 1937 2 Sheets-Sheet 2
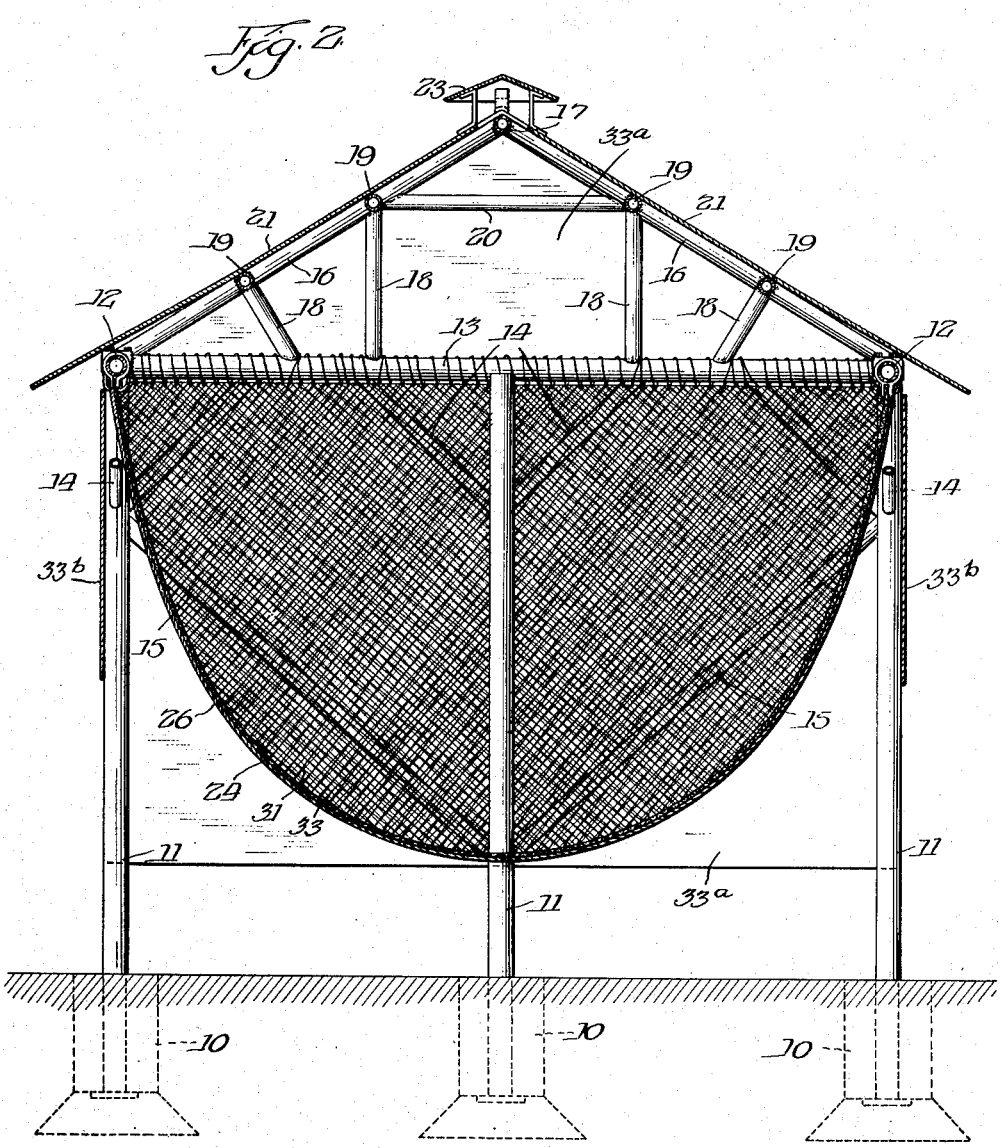
Inventor:
Thomas R. Connor Patented Feb. 18, 1941

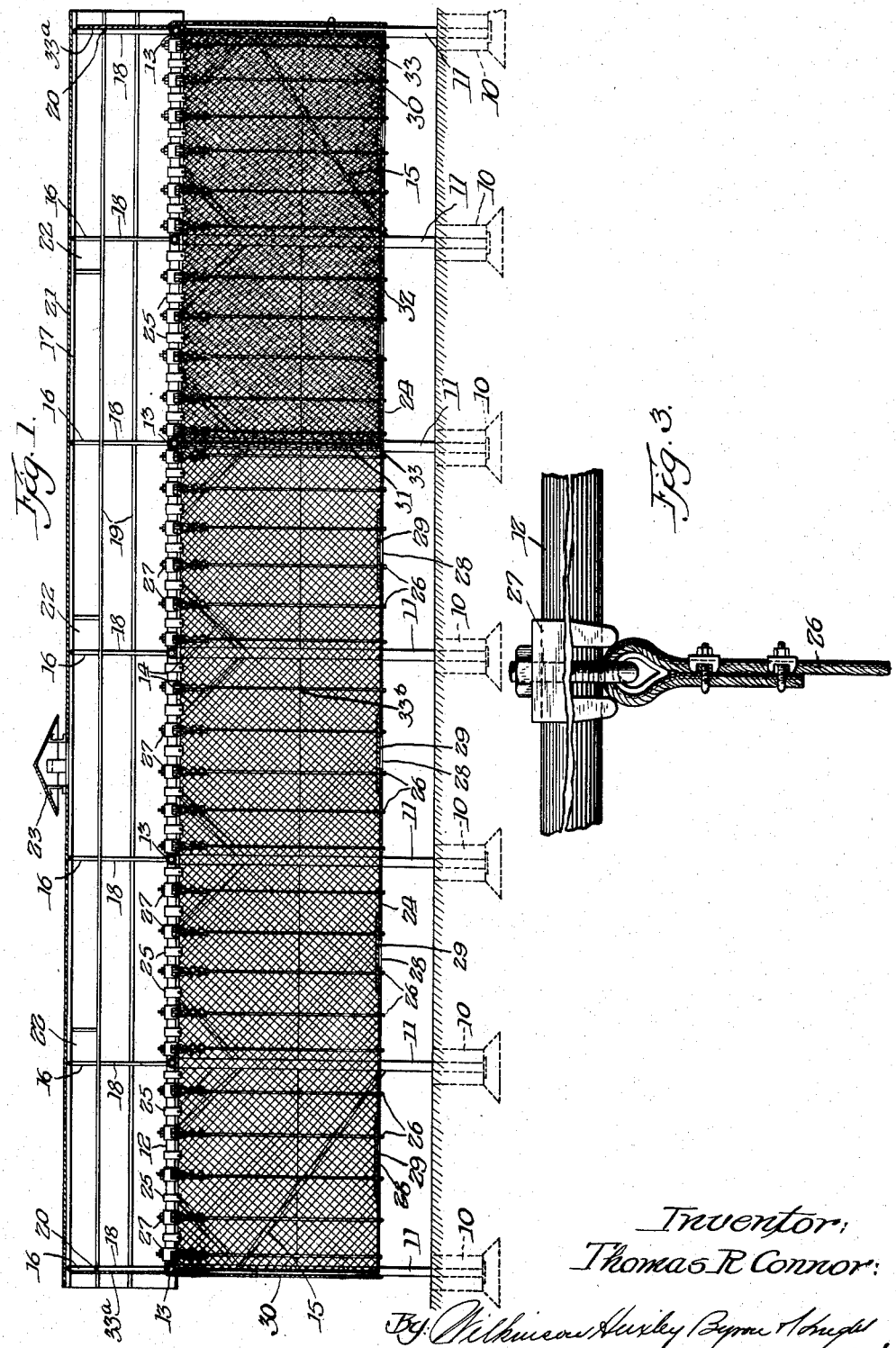

2,232,439

UNITED STATES PATENT OFFICE 2,232,439

MEANS FOR STORING GRAIN

Thomas R. Connor, Morris, Ill.

Application September 27, 1937, Serial No. 165,929

3 Claims. (Cl. 130—3)

My invention relates to means for storing grain, and has for its primary object the provision of a structure having a suspension grain-retaining member in which various kinds of grain can be stored, and which is designed so that free circulation of air is secured around the sides and ends of the structure and at the bottom below the grain, thereby allowing for thorough and complete circulation of air around the structure as well as through the grain, such as ear corn and the like, to insure proper drying out of the grain, and which is also substantially vermin-proof.

Another and further object of my invention is the provision of a structure which is so constructed that the grain-retaining member is suspended from a framework above the ground or foundation on which the structure is built, thereby allowing for the free circulation and passage of air under the grain as well as around it on all sides.

Another and further object of my invention is the provision of a structure which is substantially vermin-proof in that rats, mice and other vermin which is destructive to grain in storage places will not be able to secure access to the structure and the structure is therefore substantially vermin-proof.

Another and further object of my invention is the provision of a structure in which the grain can be easily placed therein and removed therefrom so that easy access can be had to the structure for the purpose of storing grain therein, and no excessive amount of labor is involved either in placing the grain in the structure for storage purposes or removing it therefrom when desired.

Another and further object of my invention is the provision of an all metal structure which is fireproof, which can be easily and cheaply erected and when erected is durable and will remain in position for a long time, and which is so constructed that the contents of the structure while being subjected to a free circulation of air are thoroughly protected from the weather, rain and the like.

Another and further object of my invention is the provision of a novel structure in which a frame is provided for the purpose of supporting the grain-retaining portion of the structure, which is made of wire mesh anchored at each end to purlines of the frame and extending downward suspended from the ground so that the grain, when supported therein, is placed in such position that adequate circulation of air is obtained around the entire body of the grain, thereby allowing for quick and thorough drying of the grain, particularly ear corn, and at the same time providing adequate and proper storage facilities for the grain.

Another and further object of my invention is the provision of a structure in which various kinds of grain, such as ear corn, shelled corn, oats, wheat and barley, can be stored, but such farm products as cut hay, cut fodder and the like can be suitably stored and preserved for use as stock food and the like.

These and other objects of my invention will be more fully and better understood by reference to the accompanying sheets of drawings, in which—

Figure 1 is a longitudinal view of my improved structure;

Figure 2 is a transverse sectional view of the structure shown in Figure 1; and

Figure 3 is a detailed view showing the means employed for securing the supporting cables to the purlines.

Referring specifically to the drawings and in which like reference characters refer to like parts throughout, foundation members 10, 10 are shown, preferably of concrete or the like, which are set in appropriate holes provided in the ground and have mounted therein vertical support members 11, 11, these support members preferably being pipe, but which may be angles or any other form of support members which may be convenient. These members are of equal height and preferably are placed in alignment in two directions and have purlines 12, 12 mounted at the tops thereof, preferably by being welded to the support members 11, 11, although if the framework is composed of fabricated steel in the form of angles or the like, these members may be secured to the tops of the supporting posts 11, 11 in any manner desired.

Transversely extending members 13, 13 are provided which serve to brace the structure at the top thereof, these members preferably being welded to the purlines 12, 12 at each of their ends, with suitable braces 14, 14 being provided which are welded at one of their ends to the vertical posts 11 and at their upper ends to the purlines 12. At the ends of the structural diagonal braces 15, 15 are provided which are secured adjacent their lower ends to the posts 11 mounted at the ends thereof, these members serving to support and brace the end portions to provide the supporting framework for the structure.

Rafters 16, 16 are provided which are welded at their lower ends to the purlines 12 and at their upper ends to a ridge pole 17, and are further supported by braces 18, 18 welded at their lower ends to the transverse support members 13, 13 and at their upper ends to the longitudinal members 19, 19, with transversely extending members 20, 20 being provided which extend between the upper set of longitudinal roof supporting members 19, 19.

Preferably this frame structure is made of pipe and may be made of discarded pipe used in oil fields when the threads on ends of the pipe have become unsuitable for use. The structure is preferably erected on the field by cutting the pipe to suitable length, forming recesses therein by the use of a blow torch, and electrically arc welding the parts together, thereby forming a welded structure which is capable of supporting the grain receiving and supporting member hereinafter described.

A roof 21, preferably of metal, is provided which is laid upon the purlines 12, the longitudinally extending support members 19, 19 and ridge pole 17, with eave portions extending down over the purlines 12 a substantial distance so that the contents of the structure are protected from water dripping off the edge of the eaves or being blown against the side of the structure. Doors 22, 22 are provided in the structure and ventilators 23, 23 are also provided by means of which a free circulation of air is secured from the top of the structure above the grain and under the roof.

For the purpose of supporting the grain, I provide a flexible steel woven member 24 which is suspended from the purlines 12, 12 at each side of the frame structure by means of clamps 25, 25 which are fitted around the purlines 12 and attached to the edges of the mesh member 24, so that this member is suspended from the purlines 12, 12 at each of its ends and hangs down somewhat in hammock fashion between the supporting row of posts 11 on each side of the structure and at its bottom is suspended from the ground a short distance particularly as shown in Figure 2. This grain retaining member 24 may be of any approved woven material, such as wire fencing or the like, of small enough mesh to prevent the grain, such as corn in the ear, from passing through, but I prefer to use a common type of wire fencing of a heavy gauge iron, preferably of a link woven structure made of 6-gauge wire such as is used for enclosures in parks, golf clubs and the like.

To further support this material a plurality of cables 26, 26 is provided which are secured at each of their ends to the purlines 12 by means of usual cable clamps 27, 27, these cables extending circumferentially around the grain-retaining member 24 to support it when filled with grain. If desired, these cables can be secured at each of their ends to other cables which extend parallel with the purlines 12 and which are anchored at each of their ends. This structure would result in lesser sized purlines 12 being used and in some ways would make a cheaper construction. However, I consider this form the full equivalent of the use of the purlines 12 for this purpose and merely as an alternative structure of substantially the form as the one illustrated in the drawings.

The wire retaining member at the bottom thereof has openings 28, 28 formed therein with doors 29, 29 being provided which are laid across the openings 28, these openings in the member 24 being provided merely by cutting the strands of wire forming this member and turning the free ends of the strands around the cables 26, 26.

End members 30, 30 are provided, these members being suspended from the cross members 13 by means of appropriate clamps, such as 25, 25, with the end members 30 being wired or otherwise secured through the mesh of the member 24 to form closures to prevent the escape of grain from the ends of the structure. Also, if desired, a division member 31 may be provided which is secured in the same fashion to one of the cross members as the end members 30, and a small mesh member 32 placed inside of the grain supporting member 24 with end members 33, 33 being provided for retaining small grain, such as wheat, oats, barley and the like, the inner retaining member being sufficiently small in mesh to prevent the passage therethrough of small grains. Other divisions may, of course, be provided in the structure for the purpose of providing means for storing different kinds and grades of grain, as may be desired or deemed expedient by the user. The gables of the structure are closed by members 33ª of the same material of which the roof is composed, and may be extended downward a sufficient distance to substantially close the ends of the structure to protect the material stored therein from damage because of rain, snow or the like. Siding 33ᵇ may also be provided which extends downward below the eaves a substantial distance to protect the contents of the structure from rain, snow or the like.

For the purpose of filling the structure, the doors 29, 29 are provided which are adapted to receive the ends of elevators projecting up to the top of the roof, which elevators are now commonly used in filling cribs and the like. For the purpose of emptying the structure the receiving end of the elevator is placed on the ground underneath the opening 28, the doors 29 moved to one side, whereupon the grain will fall by gravity out of the structure onto the receiving end of the elevator for transporting it onto a wagon or other vehicle for transportation.

The ventilators in the roof are provided so that after grain is stored the heated air passing up to the space underneath the roof of the building can pass away, while the air circulating around the entire body of the structure can gain access to the grain, passing therethrough and assisting in carrying away moisture and drying out and curing the grain stored therein. Also, the rays of sun striking upon the roof will heat the air over the grain in excess of that of the atmosphere, causing the air to pass out through the ventilators and thus assisting in the passage of air through the mass of grain and enabling it to become dried out and cured by the passage of air therethrough.

Instead of woven material such as fencing being employed, I may utilize other forms of suspension means such as steel or wooden slats welded or otherwise secured to cables in spaced relation with each other, the ends of the cables being anchored to the purlines. Hardware cloth may also be used as a liner which would retain many kinds of grain, feed and the like, for indefinite periods.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A grain receiving and storage structure comprising a frame, flexible members secured to the frame at each of their ends, swinging clear of the ground in catenary relation between their points of support, an open mesh grain receiving and supporting member carried by said cables, a lining of hardware cloth carried by said open mesh grain receiving and supporting member, and discharge doors at the lowest point of suspension adjacent the ground between said flexible members supported by the said grain receiving and supporting member, the said grain receiving and supporting member being held clear of the ground whereby a free circulation of air entirely around the body of grain is maintained at all times.

2. A grain storage crib comprising, in combination, vertical members, horizontal extending members secured to said vertical members, transverse members secured to said horizontal members at each of their ends, a catenary suspension grain supporting member secured to said horizontally extending members at each of its ends and hanging downward clear of the ground therebetween, the said suspension member having openings therein of a size whereby a substantial portion of the entire outer surface of the grain lying against the said member is exposed to the air, roof supports, a roof spaced upward from the crib and sloped upwardly toward the center, thereby providing a central space whereby air may circulate freely over the top of the contents of the crib, and ventilating means in said roof for the escape of heated air from said central space.

3. A grain storage crib comprising in combination, vertical members, horizontal extending members secured to said vertical members, transverse members secured to said horizontal members at each of their ends, a catenary suspension grain supporting member secured to said horizontally extending members at each of its ends and hanging downward clear of the ground therebetween, the said suspension member having openings therein of a size whereby a substantial portion of the entire outer surface of the grain lying against the said member is exposed to the air, roof supports, a roof spaced upward from the crib at its central portion whereby air may circulate freely over the top of the contents of the crib, and ventilating means in said roof.

THOMAS R. CONNOR.